United States Patent Office 3,499,434
Patented Mar. 10, 1970

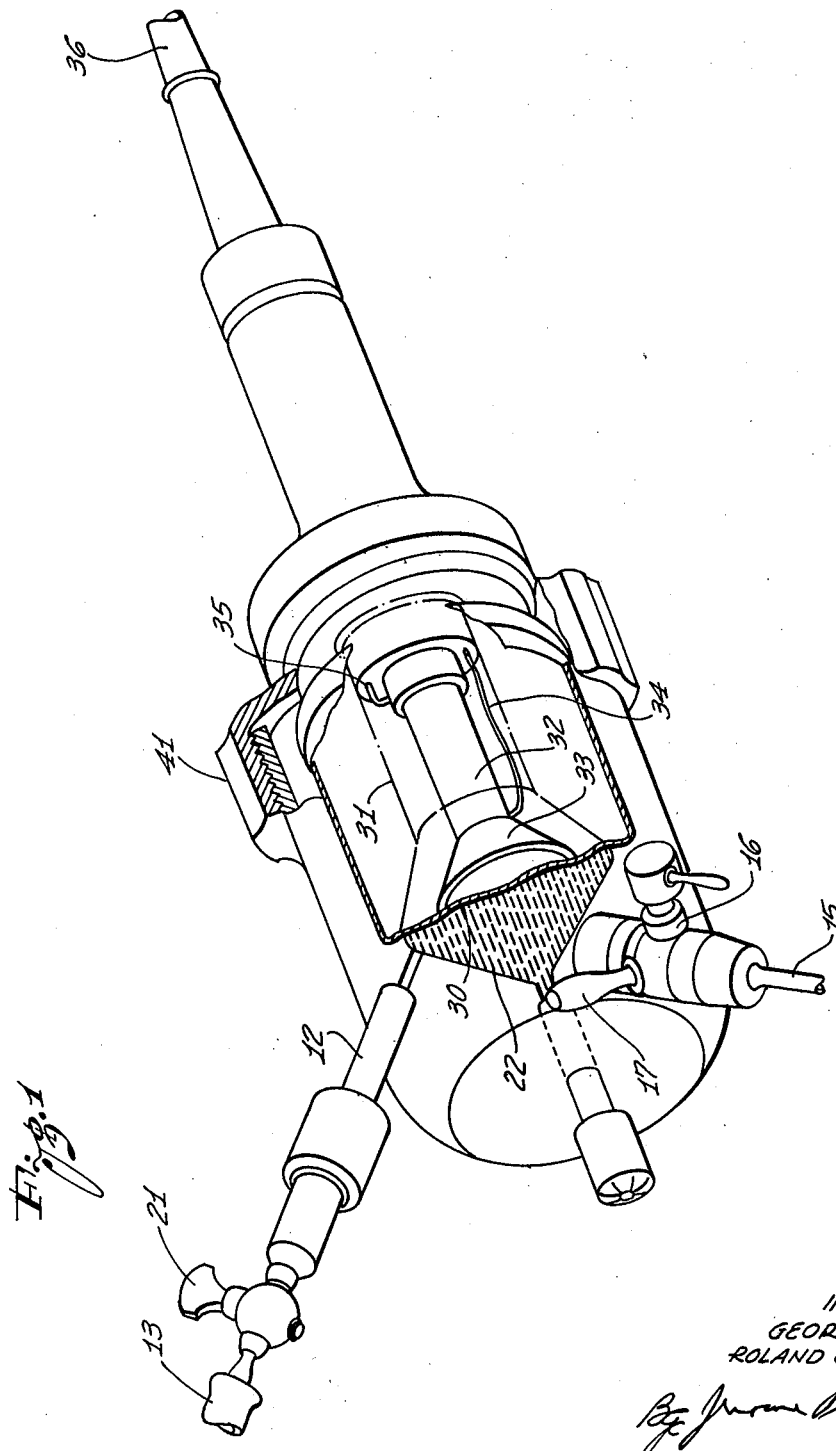

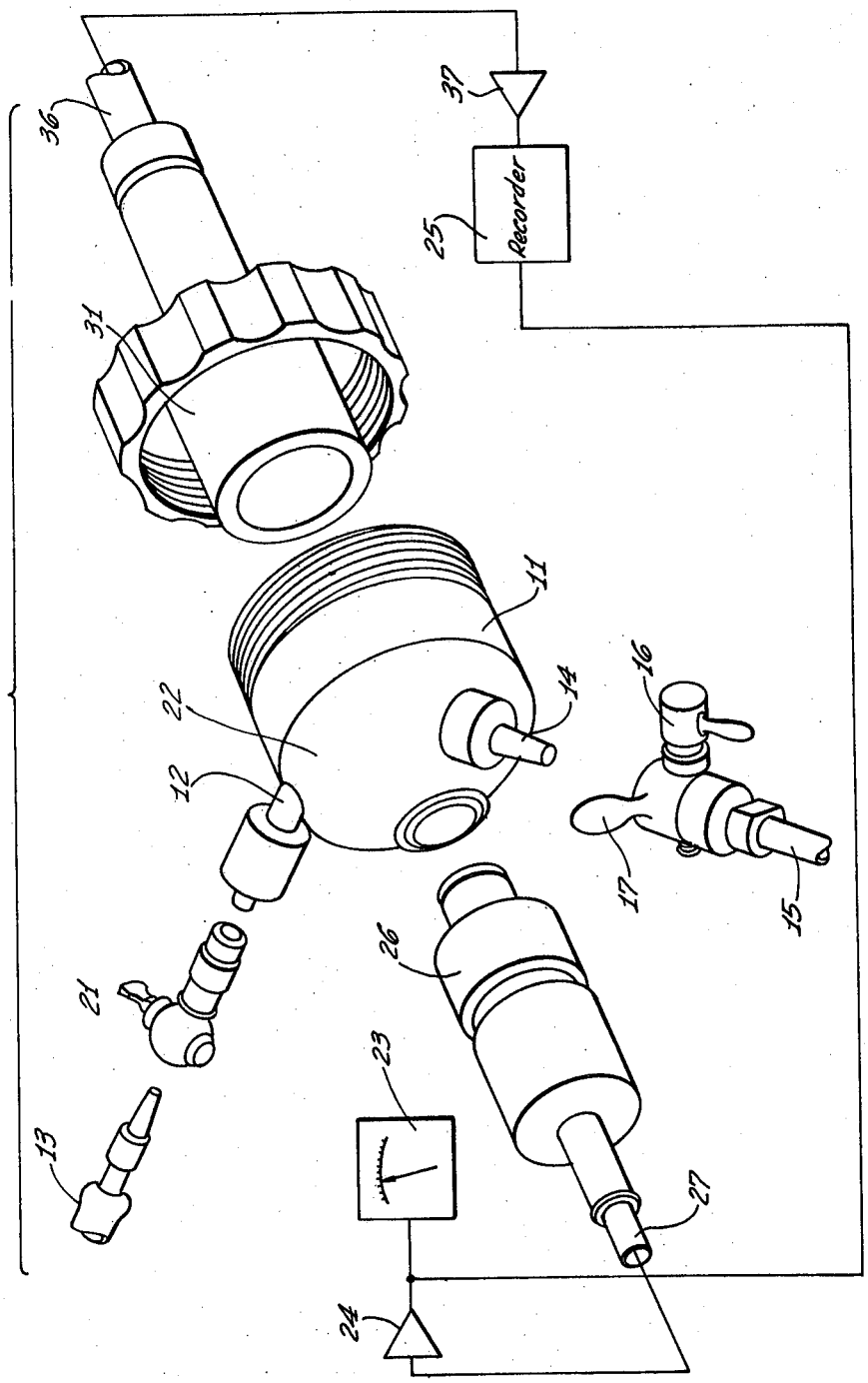

3,499,434
DEVICE FOR MEASURING AND/OR RECORDING INTRACARDIAC PRESSURE AND SOUNDS
Georg Ullrich and Roland Gaggstatter, Freiburg im Breisgau, Germany, assignors to Fritz Hellige & Co., G.m.b.H., Freiburg im Breisgau, Germany
Filed Apr. 11, 1966, Ser. No. 541,637
Claims priority, application Germany, Apr. 12, 1965, 1,466,832
Int. Cl. A61b 5/02
U.S. Cl. 128—2.05                           6 Claims

ABSTRACT OF THE DISCLOSURE

An intracardiac sound and pressure diagnostic apparatus comprising fluid-containing pressure head means and catheter means cooperating with sound transducer means and pressure transducer means for providing respective electrical signals indicative of sounds and pressures, respectively.

---

This invention relates to measuring and recording intracardiac pressures and sounds, and more particularly, to an external device having separate pressure and sound transducers connected to a single intracardiac catheter.

The determination of pressure and the observation of sounds occurring in the heart interior and resulting from heart activity with the aid of a catheter are achieving growing importance in diagnosis. They permit determining the location of even very small ventricle-septum-defects which could not formerly be tracked down. Also superimposed sounds, such as those resulting from combined defects, can be cleanly separated from one another. Extracardiac noises, for example bronchial and lung noises, and noises in the large vessels, on the other hand, cannot be observed in the heart interior and, therefore, do not cause any difficulty. Since it is also almost impossible for the heart noises to be transmitted from ventricle to ventricle when the septum is intact, it is possible to locate the source of the sounds with great precision. The development of efficiently operating apparatus necessary for this purpose, especially of the pressure and sound receiver connected to the interior of the heart by means of a catheter, is gaining increasing technical importance.

In order to determine simultaneously the static pressure fluctuations in the heart and the heart sounds, heart catheters are known in the art which include a microphone on the end of a catheter introduced into the interior of the heart through an artery. The microphone converts the low frequency pressure fluctuations, as well as the high frequency sounds into electrical signals, and the two phenomena can be separated by filtering the signals transmitted by an electrical cable.

However, it has not been possible to provide a microphone which is small enough to be introduced into the interior of the heart by means of a catheter, and exhibits equally good response to the low frequency pressure fluctuations as well as the higher frequency sounds with the required sensitivity. Providing sufficient pressure sensitivity has resulted in greatly reduced sound sensitivity, and vice versa. When a compromise characteristic is provided, neither the sound nor pressure sensitivity is satisfactory.

Another approach known to the art has required the insertion of a catheter having two outer branches, with the pressure transducer at the end of one and the microphone at the end of the other. Here a problem arises due to the fact that transmission of pressure fluctuations and noises from the interior of the heart through the catheter fluid to the transducers connected to the outer catheter ends takes a finite time. For the exact synchronization necessary for recording both phenomena, the arrangement of both measuring devices at the same distance from the interior of the heart is essential. The branched catheters promoted the formation of air bubbles. The presence of air bubbles in the catheter line, however, may stop the transmission of heart noises completely.

In contrast to the prior art devices, the present invention provides separate sensitive pressure and sound transducers connected to the heart by means of a single catheter. Compromises are not necessary as to sensitivity, frequence range or size. The pressure and sound signals travel the same distance along the same path, insuring synchronization.

It is, therefore, an object of this invention to provide an intracardiac pressure and sound recording and measuring device.

Another object of this invention is to provide an intracardiac pressure and sound recording and measuring device having separate pressure and sound transducers and connected to the heart interior by a single catheter.

Another object of this invention is to provide an intracardiac pressure and sound measuring and recording device having great sensitivity, providing synchronized pressure and sound output signals, which is simple to use, is reliable, and is inexpensive to manufacture.

These and other objects and advantages of the present invention will become apparent from the following specification and drawings, wherein:

FIGURE 1 illustrates the intracardiac sound and pressure measuring and recording device of the present invention in a partially cut-away perspective, and FIGURE 2 is an exploded view of the intracardiac sound and pressure measuring device of the present invention.

The present invention comprehends that the sound and pressure transducers are separate units, so that each meets the requirements of its particular function with greater sensitivity. The two transducers, one for intracardiac pressure fluctuations and the other for sound, are connected to the interior of the heart over a common pressure head at the outer end of the catheter through the catheter fluid, so that the catheter fluid acts as a pressure and sound transmitter. Either a glucose or salt solution can be used as a catheter fluid and to fill the fluid chamber. According to the invention, there is attached to the housing 11 a tube 12 which joins to a hose 13 to permit flushing the device and for introducing the catheter fluid. Suitably, a connecting tube 14 for the catheter 15 is provided with a valve 16 and a lateral connecting tube 17 for tapping blood and for flushing the catheter. Also, connecting tube 12 is fitted with a valve 21, so as to shut off the pressure head subsequent to filling or flushing.

An electromanometer, known per se, attached to the front of the common pressure head 22 serves as a mechanical-electrical pressure transducer. Exemplarily, expandable strips connected in a measuring bridge circuit may be used as a pressure transducer to convert the pressure fluctuations into electrical signals. The pressure signals are fed into a measuring device 23 and recording device 25 through an amplifier 24. In the illustrated embodiment, the pressure transducer 26 is accommodated by a cylindrical housing, and connected by means of a cable 27 to the measuring and recording devices through the amplifier 24.

The sound transducer comprises a heart sound microphone 31, consisting of a piezoelectric body 32. Piezoelectric body 32 has at the extreme end a sound directing cone 33, which is in mechanical contact with a fluid-tight stainless steel membrane 30, segregating the catheter fluid to one side of the pressure head 22. Stainless steel membrane 30 also constitutes one element of the microphone 31. The two conductive electrodes applied to piezoelectric body 33 have electrical connections 34 and 35 which continue through a cable 36 to the sound amplifier 37 and to the associated indicating or recording device 25. The microphone 31 is fastened by threaded connector 41 on the one side of the pressure head to housing 11. The construction so described results in very high sensitivity, so that even very slight bendings of the membrane 30, caused by sound vibrations, produce electrical voltage fluctuations in the piezoelectric body.

Both measuring transducers 26 and 31 cooperate with one single common pressure head. The shape of the pressure head makes it unlikely that air bubbles will form. In addition, bubbles can be almost completely prevented or expelled by a flushing step when the head is filled. Even the smallest air buble, although it does not much impair the recording of pressure, may completely cut off sound transmission. In prior arrangements, when connecting a heart sound microphone and an electromanometer to a heart catheter, either a separate catheter or a distributor with branched pressure transmitting connections to the pressure head, one for the microphone and another for the manometer, were necessary. In these prior art devices there were many locations in the catheter connections or tubes where air bubbles could settle and remain. To remove the air bubbles was quite difficult. In comparison, the arrangement of the present invention removes such sources of difficulty.

Because the pressure and sound transmitters, though they are on the outer end of the catheter, are so arranged that they are the same distance from the source, the time delay in the transmission from the interior of the heart to the pressure head does not matter. Synchronization of monitoring pressure and heart noises is automatic. The sources of disturbances which can be caused by a separate arrangement of pressure lines for sound and for pressure recording, are diminished. In addition, the heart catheter also need not have such a large diameter as was necessary for the accommodation of two separate pressure lines. Finally, it is obvious that it is an advantage not to have to accommodate a comparatively large microphone in the catheter head. With a filling free of air bubbles, the catheter fluid filling provides an ideal pressure transmission line.

Finally, it is also another particular advantage of the device of the present invention that the catheter can also serve to tap off blood, since the catheter head is not closed by a microphone. Therefore, other tests, such as determining the oxygen content of the blood to be found in the heart cavity, may be performed employing the same catheter.

As a result of the present invention, a device for determining the heart interior pressure and heart sounds is provided which constitutes a significant improvement of the classic catheter methods, wherein only the determination of pressure and tapping off of blood have been possible. By the simultaneous observation of the heart sounds, which gives additional information, diagnostic mistakes can be prevented and uncertainties removed.

Since many variations of the hereinabove disclosed embodiment of this invention will be apparent to those skilled in the art, the invention is to be given its broadest possible interpretation within the terms of the following claims.

What is claimed is:

1. Intracardiac sound and pressure diagnostic apparatus comprising: fluid-containing pressure head means for establishing pressure; catheter means connected to said pressure head means for intracardiac insertion; sound transducer means in communication with said pressure head means for converting high frequency sounds to electrical signals; and pressure transducer means in communication with said pressure head means for converting low frequency pressure fluctuations to electrical signals.

2. In the apparatus of claim 1, said pressure head means having fluid-confining membrane means for separating said catheter means from said sound transducer means and for facilitating sounds to travel to said sound transducer means.

3. In the apparatus of claim 2, said transducer means in communication with said membrane means for ensuring that said pressure transducer means and sound transducer means are the same distance from said catheter means.

4. In the apparatus of claim 3, said sound transducer means comprising a microphone including a piezoelectric crystal and cone shaped member means for coupling said membrane to said piezoelectric crystal.

5. In the apparatus of claim 3, said pressure head means including a cylindrical housing, said membrane means medially positioned in said housing to form a fluid chamber, catheter connecting means communicating with said fluid chamber, and tubing connecting means communicating with said fluid chamber for flushing and filling said chamber.

6. In the apparatus of claim 5, a first recording instrument; a second recording instrument; and electrical connecting means for connecting said microphone to said first recording instrument, said electrical connecting means for further connecting said microphone and said pressure transducer means to said second recording instrument.

References Cited

UNITED STATES PATENTS

| | | | |
|---|---|---|---|
| 2,535,998 | 12/1950 | Bierman | 73—389 |
| 3,099,262 | 7/1963 | Bigliano | 128—2.05 |
| 3,189,023 | 6/1965 | Salz | 128—2.05 |
| 3,299,882 | 1/1967 | Masino | 128—2.05 |

RICHARD A. GAUDET, Primary Examiner

KYLE L. HOWELL, Assistant Examiner